(12) United States Patent
Altman et al.

(10) Patent No.: US 8,638,900 B2
(45) Date of Patent: Jan. 28, 2014

(54) NUCLEAR REACTOR ALIGNMENT PLATE CONFIGURATION

(75) Inventors: David A. Altman, Pittsburgh, PA (US);
David R. Forsyth, Cheswick, PA (US);
Richard E. Smith, Harrison City, PA (US); Norman R. Singleton, Murrysville, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 1495 days.

(21) Appl. No.: 11/855,196

(22) Filed: Sep. 14, 2007

(65) Prior Publication Data

US 2009/0296877 A1   Dec. 3, 2009

Related U.S. Application Data

(60) Provisional application No. 60/883,072, filed on Jan. 2, 2007.

(51) Int. Cl.
*G21C 1/04* (2006.01)

(52) U.S. Cl.
USPC .............................. 376/353; 376/347; 376/461

(58) Field of Classification Search
USPC .................................. 376/461, 302, 260, 303
See application file for complete search history.

(56) References Cited

U.S. PATENT DOCUMENTS

| 3,720,581 | A | * | 3/1973 | Kaser ............................. 376/287 |
| 4,788,033 | A | | 11/1988 | Veronesi |
| 5,550,883 | A | * | 8/1996 | Bougis ............................ 376/302 |
| 5,600,690 | A | * | 2/1997 | Weems et al. .................. 376/302 |
| 5,864,594 | A | | 1/1999 | Balog et al. |
| 5,991,353 | A | * | 11/1999 | Dippel et al. ................. 376/302 |
| 6,067,338 | A | | 5/2000 | Erbes |

OTHER PUBLICATIONS

Merriam-Webster's Collegiate Dictionary, Tenth Edition, 1999, pp. 553 and 610.*

* cited by examiner

*Primary Examiner* — Jack W Keith
*Assistant Examiner* — Marshall O'Connor
(74) *Attorney, Agent, or Firm* — Joseph C. Spadacene; Westinghouse Electric Company LLC (57) ABSTRACT

An alignment plate that is attached to a core barrel of a pressurized water reactor and fits within slots within a top plate of a lower core shroud and upper core plate to maintain lateral alignment of the reactor internals. The alignment plate is connected to the core barrel through two vertically-spaced dowel pins that extend from the outside surface of the core barrel through a reinforcement pad and into corresponding holes in the alignment plate. Additionally, threaded fasteners are inserted around the perimeter of the reinforcement pad and into the alignment plate to further secure the alignment plate to the core barrel. A fillet weld also is deposited around the perimeter of the reinforcement pad. To accommodate thermal growth between the alignment plate and the core barrel, a gap is left above, below and at both sides of one of the dowel pins in the alignment plate holes through which the dowel pins pass.

14 Claims, 6 Drawing Sheets

NUCLEAR REACTOR ALIGNMENT PLATE CONFIGURATION

CROSS-REFERENCE TO RELATED APPLICATIONS

This application claims priority to U.S. Provisional Patent Application No. 60/883,072, filed on Jan. 2, 2007.

GOVERNMENT INTEREST

This invention was made with government support under Contract No. DE-FC07-051D14636 awarded by the Department of Energy. The government has certain rights in this invention.

BACKGROUND OF THE INVENTION

1. Field of the Invention

The present invention relates generally to nuclear reactor internals, more specifically to apparatus for maintaining the alignment of the nuclear reactor internals while permitting thermal growth.

2. Description of Related Art

The primary side of nuclear reactor power generating systems which are cooled with water under pressure comprises a closed circuit which is isolated from and in heat-exchange relationship with a secondary side for the production of useful energy. The primary side comprises the reactor vessel enclosing a core supporting a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side. The primary side is also connected to auxiliary circuits, including a circuit for volumetric and chemical monitoring of the pressurized water. This auxiliary circuit, which is arranged branching on the primary circuit, makes it possible to maintain the quantity of water in the primary circuit by replenishing, when required, with measured quantities of water, and to monitor the chemical properties of the coolant water, particularly its content of boric acid, which is important to the operation of the reactor.

The average temperature of the core components during full power reactor operation is approximately 580° F. (304° C.). Periodically, it is necessary to shut down the reactor system for maintenance and to gain access to the interior side of the pressure vessel. During such an outage, the internal components of the pressure vessel can cool to a temperature of approximately 50° F. (10° C.). The internal components of the reactor pressure vessel typically consist of upper and lower internals. The upper internals include a control rod guide tube assembly, support columns, conduits for instrumentation which enter the reactor vessel through the closure head, and a fuel assembly alignment structure, referred to as the upper core plate. The lower internals include a core support structure referred to as a core barrel, a core shroud that sits inside the core barrel and converts the circular interior of the barrel to a stepped pattern that substantially corresponds to the perimeter profile of the fuel assemblies within the core supported between a lower core support plate and the upper core plate. As an alternate to the core shroud, a bolted baffle former structure consisting of machined horizontal former and vertical baffle plates, has been employed. It is particularly important to maintain a tight alignment of the reactor internals upper core plate and a top plate of the shroud with the control rod drive mechanisms to assure that the control rods can properly scram; i.e., drop into the core, when necessary. This is particularly challenging when one considers the thermal expansion and contraction that has to be accommodated through power ramp-up and cool down sequences, where temperatures can vary between 50° F. (10° C.) and 580° F. (304° C.).

Figure 1:
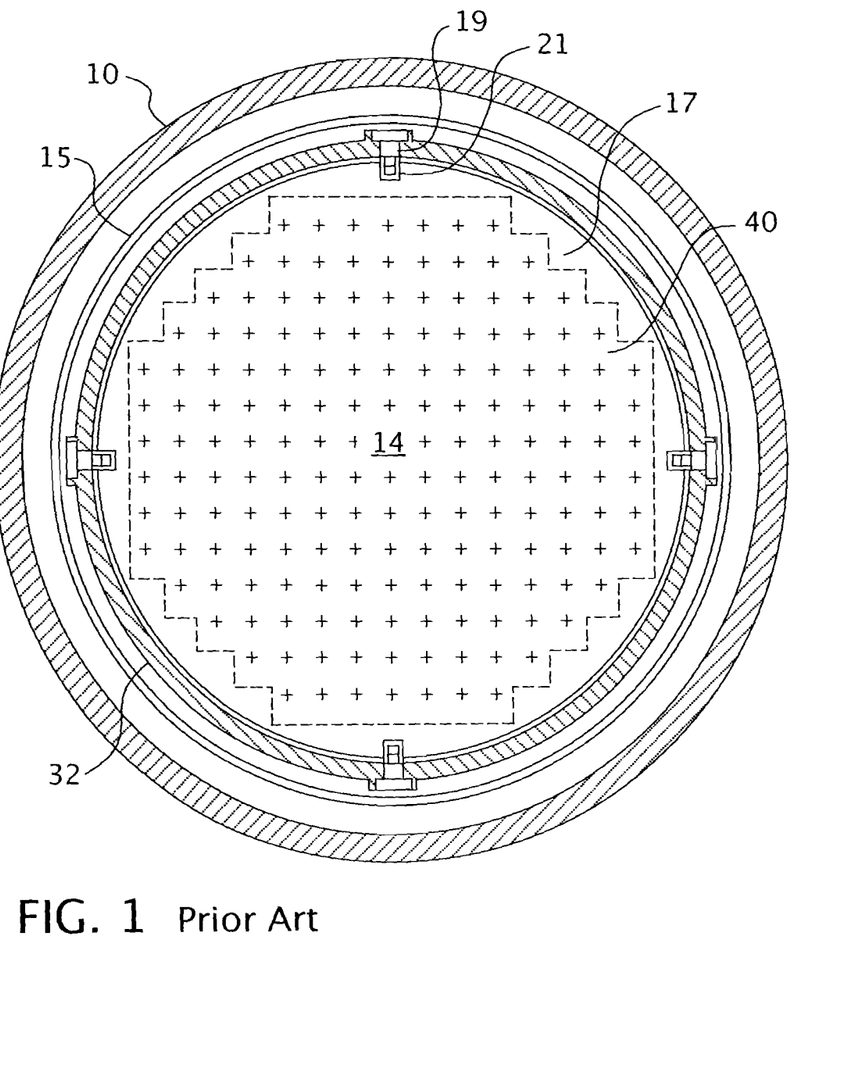
FIG. 1 is a cross-sectional view of a nuclear reactor vessel showing the pressure vessel, thermal shield, core barrel, core shroud and the core fuel assemblies.

In conventional designs, lateral alignment of the upper internals components was accomplished with a series of single pins located around the circumference of the core barrel. The upper core plate alignment pins fit in notches in the upper core plate and locate the upper core plate laterally with respect to the lower internals assembly. The pins must laterally support the upper core plate so that the plate is free to expand radially and move axially during differential thermal expansions between the upper internals and the core barrel. FIG. 1 is a simplified cross-section of such a conventional reactor design. A pressure vessel (10) is shown enclosing a core barrel (32) with a thermal shield (15) interposed in between. The core barrel (32) surrounds the core (14) which is held in position by an upper core plate (40). The upper core plate (40) is aligned by the alignment pins (19) which extend through the core barrel (32) into notches (21) in the upper core plate (40). The notches (21) permit the core barrel to grow with thermal expansion at a greater rate than the upper core plate (40) during start up without compromising the lateral position of the upper core plate (40). The installation sequence of the core shroud (17) in new advanced passive plant designs requires a modified design that will prevent lateral movement of both the upper core plate and the core shroud while enabling thermal growth and contraction between both the shroud and upper core plate and the core barrel, while maintaining rotational stability. Thus, it is an object of this invention to provide such a design that would facilitate the installation of the alignment apparatus, the core shroud and the upper core plate.

SUMMARY OF THE INVENTION

This invention achieves the foregoing objective by providing a pressurized water nuclear reactor having a pressure vessel with a core region for supporting fuel assemblies. A core barrel is removably disposed within the pressure vessel around the core region. A core shroud is disposed within the core barrel between the core barrel and the fuel assemblies. The core shroud has an alignment slot that orients the core shroud with the core barrel. An upper support plate is removably disposed above the fuel assemblies and the core shroud. The upper core support plate also has an alignment slot for aligning the upper core support plate with the core barrel and the core shroud. An alignment plate is attached to the core barrel and is disposed within the alignment slot of the core shroud and within the alignment slot of the upper core support plate to maintain alignment of the upper and lower internals during reactor start up, shut down and continuous operation.

Preferably, the alignment plate is attached to the inner surface of the core barrel and a reinforcing pad is disposed on the outside of the core barrel and attached to the alignment plate through the core barrel. In one embodiment, the reinforcement pad is attached to the alignment plate with at least two dowel pins that engage the reinforcement pad and the alignment plate through the core barrel. Preferably, the dowel pins are shrunk fit into the reinforcement pad, core barrel and alignment plate. The dowel pins desirably are positioned in spaced relationship with each other, one on top of the other;

the top dowel pin is shrink-fitted to holes in both the core barrel and alignment plate, thus anchoring the alignment plate to the core barrel at this location. The bottom dowel hole in the alignment plate is designed to accommodate differential axial thermal growth between the core barrel and the alignment plate. This is accomplished by machining flat surfaces on the vertical faces of the dowel pins and alignment plate, and by enlarging one of the dowel pin holes in the alignment plate so that a gap exists between a top and bottom surface of one of the dowel pins and the alignment plate, allowing differential thermal growth in the vertical direction.

In another embodiment, in addition to being secured by the dowel pins, the alignment plate and reinforcement pad are attached to the core barrel with threaded fasteners. The reinforcing pad is also welded to the core barrel, for example, with a fillet weld. Preferably, the back of the alignment plate that interfaces with the core barrel is machined to have a complementary curvature and the alignment plate is fit in a recess machined into the core barrel. Desirably, there are a plurality of alignment plates spaced around the core barrel with each being received within a corresponding slot in the core shroud and the upper core support plate. Desirably, the alignment plates on the inner surface of the core barrel are azimuthally aligned with corresponding inlet nozzles on the pressure vessel. The slots in the core shroud and upper core support plate may be fitted with inserts between the sides of the slots and the alignment plate so that a small clearance can be maintained between the sides of the slots and the alignment plate.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 2:
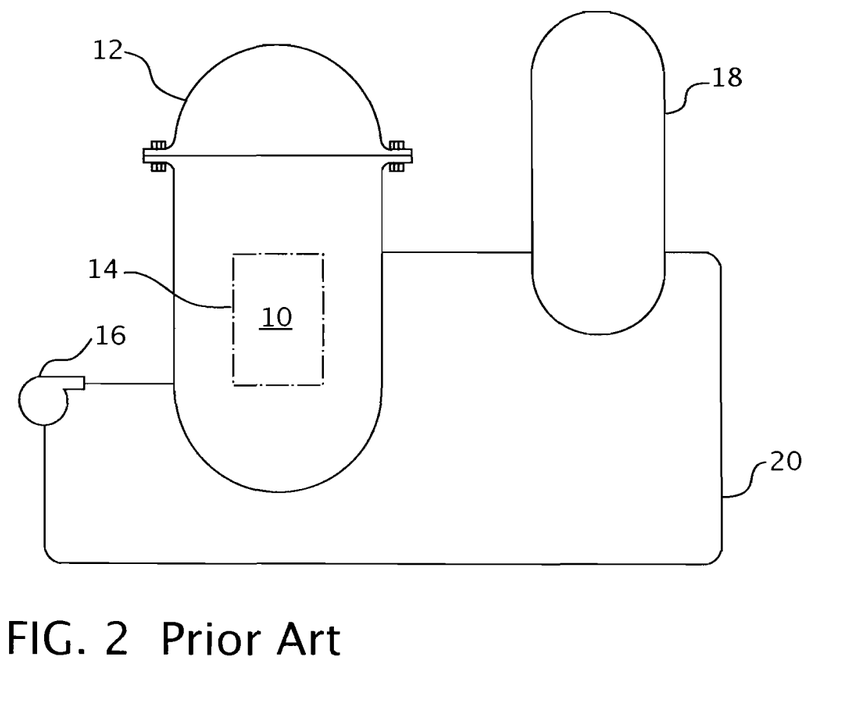
FIG. 2 is a simplified schematic of a nuclear reactor system to which this invention may be applied.

Referring now to the drawings, FIG. 2 shows a simplified nuclear reactor primary system, including a generally cylindrical reactor pressure vessel (10) having a closure head (12) enclosing a nuclear core (14). A liquid reactor coolant, such as water, is pumped into the vessel (10) by pumps (16) through the core (14) where heat energy is absorbed and is discharged to a heat exchanger, typically referred to as a steam generator, in which heat is transferred to a utilization circuit (not shown), such as a steam-driven turbine generator. The reactor coolant is then returned to the pump (16), completing the primary loop. Typically, a plurality of the above-described loops are connected to a single reactor vessel (10) by reactor coolant piping (20).

Figure 3:
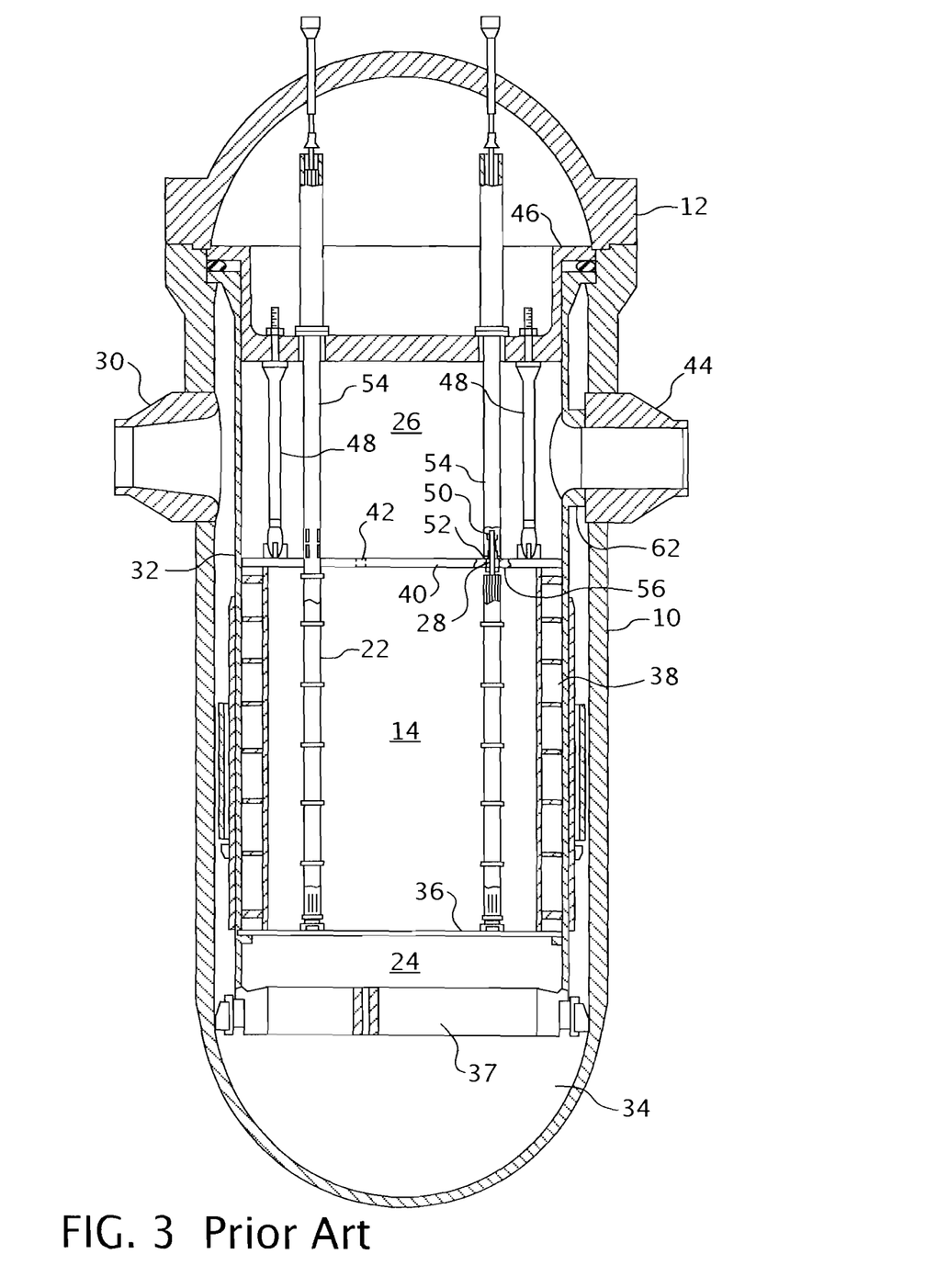
FIG. 3 is an elevational view, partially in section, of a nuclear reactor vessel and internal components to which this invention may be applied.

An exemplary reactor design is shown in more detail in FIG. 3. In addition to a core (14) comprised of a plurality of parallel, vertical co-extending fuel assemblies (22), for purposes of this description, the other vessel internal structures can be divided into the lower internals (24) and the upper internals (26). In conventional designs, the lower internals function is to support, align and guide core components and instrumentation, as well as to direct flow within the vessel. The upper internals restrain or provide a secondary restraint for the fuel assemblies (22) (only two of which are shown for simplicity), and support and guide instrumentation and components, such as control rods (28).

In the exemplary reactor shown in FIG. 3, coolant enters the vessel (10) through one or more inlet nozzles (30), flows downward through an annulus between the vessel and the core barrel (32), is turned 180° in a lower plenum (34), passes upwardly through a lower support plate (37) and a lower core plate (36) upon which the fuel assemblies (22) are seated and through and about the assemblies. In some designs the lower support plate (37) and lower core plate (36) are replaced by a single structure, the lower core support plate, at the same location as (37). The coolant flow through the core and surrounding area (38) is typically large, on the order of 400,000 gallons per minute at a velocity of approximately 20 feet per second. The resulting pressure drop and frictional forces tends to cause the fuel assemblies to rise, which movement is restrained by the upper internals, including a circular upper core plate (40). Coolant exiting the core (14) flows along the underside of the upper core plate and upwardly through a plurality of perforations (42). The coolant then flows upwardly and radially to one or more outlet nozzles (44).

The upper internals (26) can be supported from the vessel or the vessel head and include an upper support assembly (46). Loads are transmitted between the upper support plate (46) and the upper core plate (40), primarily by a plurality of support columns (48). A support column is aligned above a selected fuel assembly (22) and perforations (42) in the upper core plate (40).

Rectilinearly moveable control rods (28) typically including a drive shaft (50) in a spider assembly (52) of neutron poison rods are guided through the upper internals (26) and into aligned fuel assemblies (22) by control rod guide tubes (54). The guide tubes are fixedly joined to the upper support assembly (46) and connected by a split pin (56) force fit into the top of the upper core plate (40). The pin configuration provides for ease of guide tube assembly and replacement if ever necessary and assures that core loads, particularly under seismic or other high loading accident conditions are taken primarily by the support columns (48) and not the guide tubes (54). This assists in retarding guide tube deformation under accident conditions which could detrimentally affect control rod insertion capability.

Figure 4:
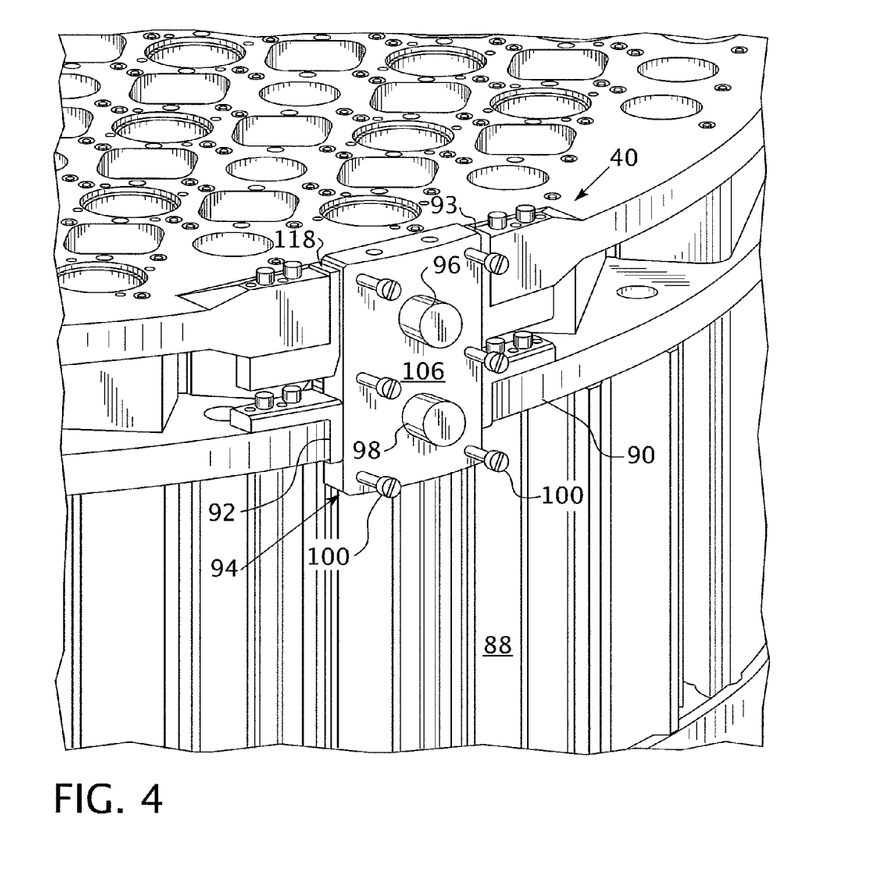
FIG. 4 is a partial perspective view of the reactor internals showing a portion of the upper core plate and core shroud with the barrel removed to show the alignment structure of this invention.

Though not shown in FIG. 3, the design of this invention includes a core shroud positioned inside the circular core barrel (32) that converts the circular inner profile of the core barrel to a stepped circumferential profile that matches the peripheral outline of the fuel assemblies (22) within the core. A portion of the shroud's stepped inner circumferential profile can be observed in FIG. 4, which provides a perspective view of a portion of the shroud (88) and upper core plate (40), with the alignment plate (94) of this invention in place within the slots (92) and (93) within the top shroud plate (90) and upper core plate (40), respectively. In FIG. 4, the core barrel has been removed for clarity. This invention presents a different design concept than the pins employed by conventional pressurized water reactor designs previously described with respect to FIG. 1, but still maintains the same functionality, i.e., radial and axial restraints for the upper core plate, in addition to supplying restraints for the core shroud components in the peripheral region around the core for the advanced passive AP1000 nuclear power plant design offered by Westinghouse Electric Company LLC. For the AP1000 nuclear power plant design, maintaining a tight alignment of the reactor internals upper core plate (40) and top shroud plate (90) with the control rod drive mechanisms is necessary to assure that the control rods can properly scram when necessary.

The alignment plate (94) of this invention, shown in FIG. 4, provides not only rotational restraint to the upper internals that was provided by the previous pin design, but also provides alignment of the core shroud (88) at the top of shroud plate (90). In this embodiment, there are four alignment plate assemblies (94) located symmetrically around the periphery of the core barrel (32) at the same angular orientation as four inlet nozzles (30) on the pressure vessel. Symmetrically located does not necessarily mean that they are equally spaced around the pressure vessel nor at the same location as the inlet nozzles. In the AP1000 design, there are two inlet nozzles on either side and within the vicinity of an outlet nozzle, and there are two outlet nozzles diametrically opposed on the vessel.

Figure 5:
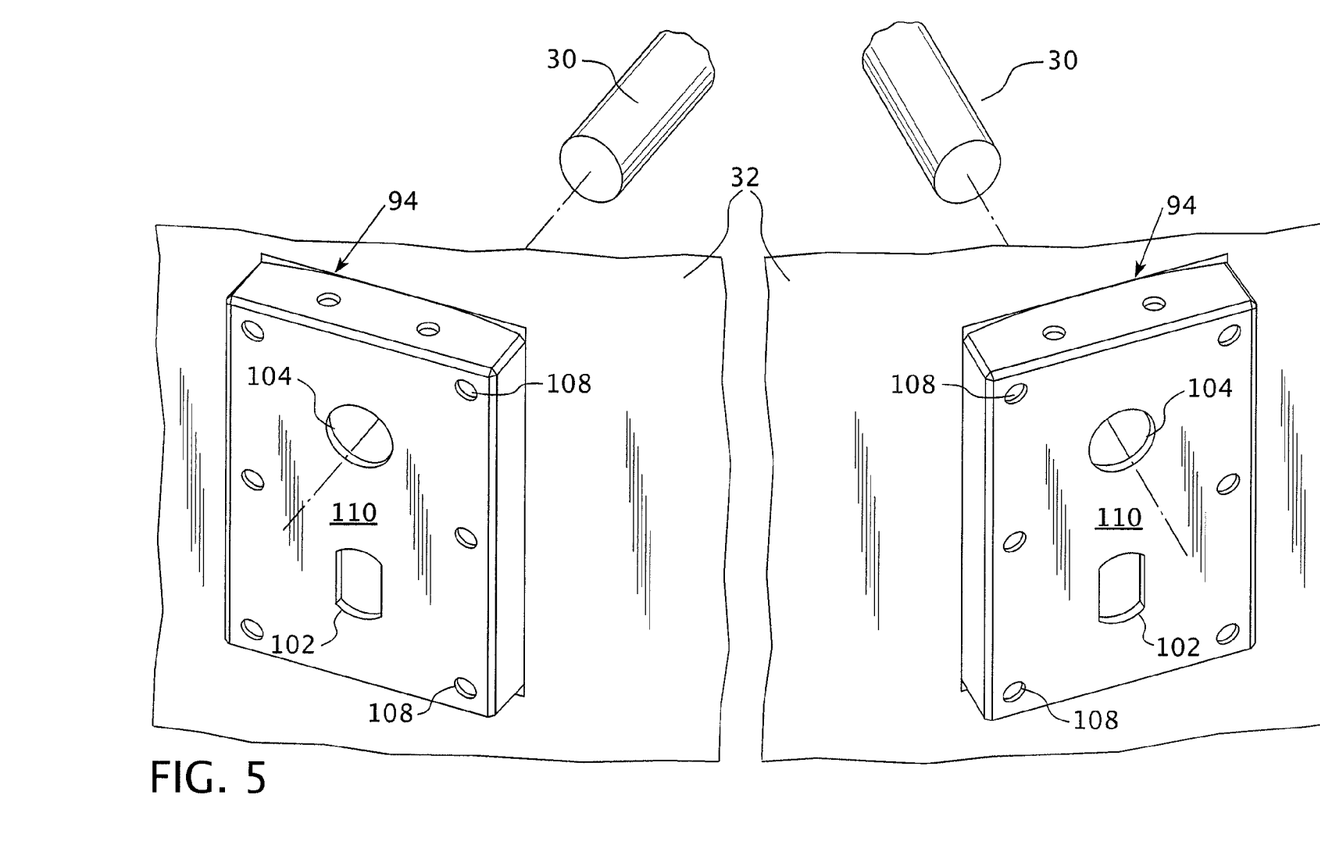
FIG. 5 is a perspective view of the front side of the alignment plate of this invention secured to the inside of the core barrel.
Figure 6:
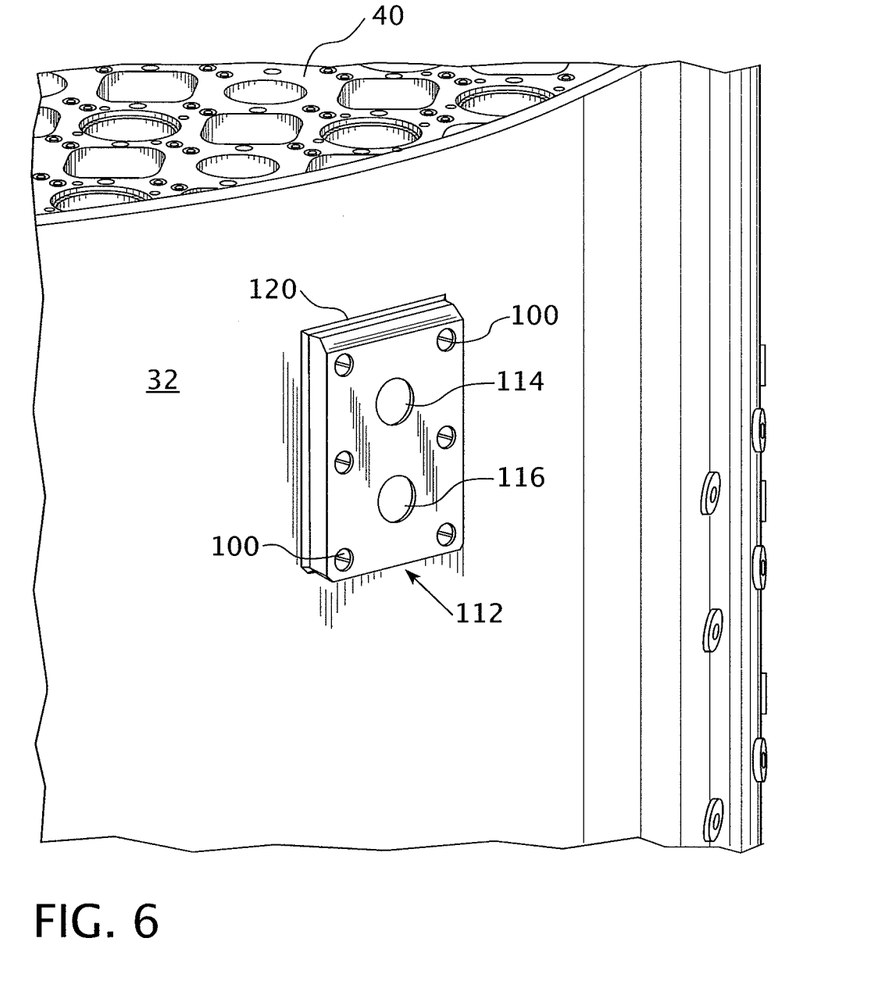
FIG. 6 is a perspective view of the reinforcement pad of this invention secured to the outside of the core barrel.

The alignment plates (94) are attached to the core barrel (32) with two dowel pins (96) and (98) and six one-inch hex cap screws (100). The hex screws (100) and dowel pins (96) and (98) are inserted through a reinforcing pad (110) (shown in FIG. 6) on the outside of the core barrel (32), the core barrel (32) and into the alignment plate (94). Attachment of the alignment plate (94) to the core barrel (32) is illustrated in FIG. 5 as viewed from the inside of the core barrel (32). Similarly, the attachment of the reinforcement pad (112) to the outside of the core barrel (32) is illustrated in FIG. 6. As shown in FIG. 6, a fillet weld 120 is made around the perimeter of the reinforcing pad (112), joining the reinforcing pad (112) to the core barrel (32). The fit up of the alignment plate (94) with the top shroud plate (90) and upper core plate (40) is shown in FIG. 4 with the core barrel removed for clarity. The alignment plate (94) is fit within the slots (92) and (93), respectively, in the top shroud plate (90) and the upper core plate (40). Inserts (118) are secured within the slots (92) and (93) on either side of the alignment plate (94) to maintain a snug fit to avoid rotational misalignment.

During assembly, the upper dowel pin (96) is shrunk fit into the reinforcing pad (112), core barrel (32) and alignment plate (94). The bottom dowel pin (98) is shrunk fit through the reinforcing pad (112) and core barrel (32) only. The bottom dowel pin (98) alignment plate (94) interface is designed to accommodate differential axial thermal growth between the core barrel (32) and the alignment plate (94). As can be seen in FIG. 5, a gap exists between the top, bottom and side surfaces of the bottom dowel pin (98) and the alignment plate (94), allowing differential thermal growth in the vertical direction. It should be appreciated that though the lower dowel hole in the alignment plate is shown enlarged, the same functionality can be achieved by enlarging the upper dowel hole instead of the lower one.

To assist in the radial positioning of the alignment plate (94) relative to the core barrel (32), the alignment plate (94) sits in a radial recess machined into the core barrel (32) to match the radius of the outside surface of the alignment plate (94). Alternatively, the back of the alignment plate (106) can be machined to match the curvature of the core barrel, or a combination of the two can be employed.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A pressurized water nuclear reactor comprising:
   a pressure vessel having a core region for supporting fuel assemblies;
   a core barrel removably disposed within the pressure vessel;
   a core shroud disposed within the core barrel, the core shroud having an alignment slot;
   an upper core support plate removably disposed above the core shroud, the upper core support plate having an alignment slot; and
   an alignment plate attached to the core barrel and disposed within the alignment slot of the core shroud and within the alignment slot of the upper core support plate.

2. The pressurized water nuclear reactor of claim 1, wherein the core barrel has an inner surface and an outer surface and the alignment plate is attached to the inner surface of the core barrel and further comprising a reinforcement pad disposed on the outer surface of the core barrel and attached to the alignment plate.

3. The pressurized water nuclear reactor of claim 2 wherein the reinforcement pad is attached to the alignment plate with at least two dowel pins that engage the reinforcement pad and alignment plate through the core barrel.

4. The pressurized water nuclear reactor of claim 3 wherein the dowel pins are shrink fit into the reinforcement pad, core barrel and alignment plate or reinforcement pad and core barrel.

5. The pressurized water nuclear reactor of claim 3 wherein the alignment plate and reinforcement pad are affixed in a vertical direction, including a bottom hole and a top hole in the alignment plate with corresponding aligned holes in the core barrel and reinforcement pad, wherein the holes respectively on the alignment plate, the core barrel and the reinforcement pad are positioned spaced one above the other and are sized to receive the dowel pins.

6. The pressurized water nuclear reactor of claim 5 wherein one of the bottom or top dowel pin-alignment plate holes is designed to accommodate differential axial thermal growth between the core barrel and alignment plate, whereby a gap exists between a top, bottom and side surfaces of the one of the top or bottom dowel pin alignment plate holes and the corresponding dowel pins with machined flats on the vertical surfaces of the one of the bottom or top dowel pin-alignment plate holes allowing differential thermal growth in the vertical direction.

7. The pressurized water nuclear reactor of claim 2 wherein the alignment plate is attached to the core barrel with threaded fasteners.

8. The pressurized water nuclear reactor of claim 7 wherein the reinforcement pad is welded to the core barrel.

9. The pressurized water nuclear reactor of claim 8 wherein the reinforcement pad is welded to the core barrel with a fillet weld.

10. The pressurized water nuclear reactor of claim 1 wherein a back of the alignment plate fits in a recess in the core barrel.

11. The pressurized water nuclear reactor of claim 1 wherein a back of the alignment plate that interfaces with the core barrel is machined to have the same curvature as the core barrel.

12. The pressurized water nuclear reactor of claim 1 wherein the pressure vessel has an inlet nozzle and the alignment plate is positioned on the inner circumference of the core barrel radially in-line with the inlet nozzle.

13. The pressurized water nuclear reactor of claim 1 wherein the pressure vessel has a plurality of inlet nozzles and a plurality of alignment plates, with each alignment plate positioned on the inner circumference of the core barrel radially in-line with a corresponding one of the plurality of inlet nozzles.

14. The pressurized water nuclear reactor of claim 1 including an insert in the core shroud alignment slot and an insert in the upper core support plate alignment slot so that a predetermined clearance can be obtained between the sides of the slots and the alignment plate.

* * * * *